United States Patent
Cui et al.

(10) Patent No.: US 10,298,297 B2
(45) Date of Patent: May 21, 2019

(54) METHOD AND DEVICE FOR FEEDING BACK DOWNLINK CHANNEL FEEDBACK INFORMATION, AND METHOD AND DEVICE FOR USER PAIRING

(75) Inventors: Qimei Cui, Beijing (CN); Shiyuan Li, Beijing (CN); Xiaofeng Tao, Beijing (CN); Chao Wang, Beijing (CN)

(73) Assignee: SONY CORPORATION, Tokyo (JP)

(*) Notice: Subject to any disclaimer, the term of this patent is extended or adjusted under 35 U.S.C. 154(b) by 537 days.

(21) Appl. No.: 13/878,581

(22) PCT Filed: Oct. 21, 2011

(86) PCT No.: PCT/CN2011/081111
§ 371 (c)(1),
(2), (4) Date: Apr. 10, 2013

(87) PCT Pub. No.: WO2012/059009
PCT Pub. Date: May 10, 2012

(65) Prior Publication Data
US 2013/0201862 A1    Aug. 8, 2013

(30) Foreign Application Priority Data
Nov. 5, 2010 (CN) .......................... 2010 1 0544399

(51) Int. Cl.
*H04B 7/0417* (2017.01)
*H04B 7/0452* (2017.01)
(Continued)

(52) U.S. Cl.
CPC ......... *H04B 7/0417* (2013.01); *H04B 7/0452* (2013.01); *H04B 7/0632* (2013.01);
(Continued)

(58) Field of Classification Search
None
See application file for complete search history.

(56) References Cited

U.S. PATENT DOCUMENTS

| 8,520,616 B2* | 8/2013 | Cui ........... H04L 5/0035 370/329 |
| 2009/0006925 A1* | 1/2009 | Pan ........... H04L 1/1861 714/758 |

(Continued)

OTHER PUBLICATIONS

Finite-Rate Feedback MIMO Broadcast Channels with a Large Number of Users, Yoo et al. 2006.*
(Continued)

*Primary Examiner* — Christopher T Wyllie
(74) *Attorney, Agent, or Firm* — Xsensus LLP

(57) ABSTRACT

A method and device for feeding back downlink channel feedback information, and a method and device for user pairing. The method for feeding back downlink channel feedback information includes: calculating the multi-user channel quality indication error of a user, which error is used to reflect the difference in channel quality indication between the situation of multi-user multiple input multiple output transmission and the situation of single user multiple input multiple output transmission; adding the multi-user channel quality indication error into the downlink channel feedback information which includes a pre-coding matrix indication and a channel quality indication, and feeding the same back to a base station for scheduling. Therefore, the bit error rate of demodulation in the MIMO system can be reduced and the system performance can be improved.

14 Claims, 6 Drawing Sheets

(51) Int. Cl.
*H04B 7/06* (2006.01)
*H04L 1/00* (2006.01)
*H04L 1/20* (2006.01)

(52) U.S. Cl.
CPC ......... *H04B 7/0634* (2013.01); *H04B 7/0639* (2013.01); *H04B 7/0689* (2013.01); *H04L 1/0026* (2013.01); *H04L 1/20* (2013.01)

(56) References Cited

U.S. PATENT DOCUMENTS

| | | | | |
|---|---|---|---|---|
| 2009/0016457 A1* | 1/2009 | Ko | ......................... | H04B 7/0434 375/260 |
| 2009/0046569 A1* | 2/2009 | Chen | ..................... | H04L 1/0029 370/203 |
| 2009/0207784 A1* | 8/2009 | Lee | ......................... | H04B 7/063 370/328 |
| 2010/0166097 A1* | 7/2010 | Zhou | ....................... | H04B 7/065 375/267 |
| 2011/0032839 A1* | 2/2011 | Chen | ..................... | H04B 7/024 370/252 |
| 2011/0044272 A1* | 2/2011 | Cui | ........................ | H04B 7/0452 370/329 |
| 2011/0141941 A1* | 6/2011 | Lee | ......................... | H04L 1/0038 370/252 |
| 2011/0176629 A1* | 7/2011 | Bayesteh | ............. | H04B 7/0417 375/267 |
| 2011/0319027 A1* | 12/2011 | Sayana | ................ | H04B 7/0632 455/67.11 |
| 2012/0063500 A1* | 3/2012 | Wang | .................... | H04L 1/0026 375/224 |
| 2012/0300656 A1* | 11/2012 | Cui | ....................... | H04B 7/0639 370/252 |
| 2013/0201862 A1* | 8/2013 | Cui | ....................... | H04B 7/0452 370/252 |
| 2013/0229941 A1* | 9/2013 | Huang | ................. | H04B 7/0452 370/252 |
| 2013/0315156 A1* | 11/2013 | Xiao | ....................... | H04B 7/024 370/329 |
| 2014/0010080 A1* | 1/2014 | Zubow | ................. | H04B 7/0417 370/230 |

OTHER PUBLICATIONS

3GGP TSG RAN WG1 Meeting #60, R1-101165, "Discussions on a unified design of CQI/PMI/RI feedback for LTE-A," Samsung, pp. 1 to 4, (Feb. 22-26, 2010).

International Search Report dated Feb. 16, 2012 in PCT/CN11/81111 Filed Oct. 21, 2011.

Extended European Search Report dated May 16, 2017, in European Patent Application No. 11837535.1.

Office Action dated Oct. 23, 2017, in Australian Patent Application No. 2016200309.

"Discussion of CQI/PMI reporting enhancement on Pusch for SU/MU-MIMO scheduling," Alcatel-Lucent Shanghai Bell, Acatel-Lucent, 3GPp TSG RAN WG1 Meeting #62bis, Oct. 2010, 11 pages.

"Physical layer procedures (Release 9)", 3GPP TS 36.213 V9.3.0, E-UTRA, 2010, pp. 50-51 and Cover Page.

"Re1.10 CSI enhancement for MU-MIMO", Texas Instruments, 3GPP TSG RAN WG1 62bis, R1-105284, Oct. 2010, 5 Pages.

\* cited by examiner

METHOD AND DEVICE FOR FEEDING BACK DOWNLINK CHANNEL FEEDBACK INFORMATION, AND METHOD AND DEVICE FOR USER PAIRING

FIELD OF THE INVENTION

The disclosure generally relates to a communication field, in particular to feeding back downlink channel feedback information of a user in a Multiple Input Multiple Output, MIMO, communication system and user pairing of a base station.

BACKGROUND OF THE INVENTION

In MIMO system, multi-antenna transmission is divided into single user MIMO (SU-MIMO) transmission mode and multi-user MIMO (MU-MIMO) transmission mode.

As shown in FIG. 1, in the SU-MIMO transmission, a base station (BS) sends a plurality of data streams on the same time-frequency resource to the same user. In contrast, in the MU-MIMO transmission, a base station (BS) sends a plurality of data streams on the same time-frequency resource to different users, and improves the system capacity by transmitting data simultaneously to a plurality of users.

Pre-coding technology is a signal processing technology which pre-processes the transmitted symbols at the transmitting side by using channel state in order to eliminate interference, improve system capacity and the like. The pre-coding needs the base station to know transmission channel information and determine a pre-coding matrix based on the transmission channel information. For example, pre-coding technology may be a pre-coding technology based on codebook, in which the codebook is the same with respect to user equipment (UE) and base station (BS). A user notifies a base station of the pre-coding matrix used by the user by feeding back a pre-coding matrix indication (PMI) to the base station.

In MIMO transmission technology using the pre-coding technology, the PMI may be included in downlink channel feedback information which a user needs to feed back to a base station. The downlink channel feedback information is information for reflecting the downlink channel state which the user feeds back to the base station through uplink channel.

In MIMO systems of LTE, for example, in downlink channel feedback of SU-MIMO, the downlink channel feedback information which a user feeds back to a base station may includes: the PMI for indicating a pre-coding matrix; and a feedback channel quality indication (CQI) for selecting a modulation coding mode of transmission data by the base station. In LTE standards, in the situation of MU-MIMO transmission, the PMI and CQI in the downlink channel feedback information which a user feeds back to a base station is obtained by optimizing the PMI and CQI in the situation of SU-MIMO transmission. However, using the PMI obtained in the situation of SU-MIMO transmission in MU-MIMO transmission may induce influence to the selection of paired user in MU-MIMO transmission and thus influence to the communication performance.

In addition, from the perspective of base station side, after the user feeding back the downlink channel feedback information, the base station determines whether the MU-MIMO transmission or the SU-MIMO transmission is used according to the downlink channel feedback information. As for SU-MIMO transmission, the base station obtains the pre-coding matrix according to the PMI in the downlink channel feedback information, and selects a suitable modulation coding mode for the user according to the CQI in the downlink channel feedback information. As for MU-MIMO transmission, the base station needs to first select paired user(s) for the user according to the downlink channel feedback information fed back by the user, and then obtain a pre-coding matrix for the user and select a suitable modulation coding mode for the user according to the PMI and CQI included in the downlink channel feedback information fed back by individual paired users selected for this user.

SUMMARY OF THE INVENTION

A brief summary about the present disclosure is provided hereinafter to provide basic understandings related to some aspects of the present disclosure. It shall be understood that this summary is not an exhaustive summary related to the present disclosure. The summary is not intended to determine a key part or an important part of the present disclosure, nor does it intend to limit the scope of the present disclosure. The purpose of the summary is only to provide some concepts in simplified forms to prelude more detailed descriptions discussed later One object of the disclosure is to provide feeding back of downlink channel feedback information, which may further increase information for representing the quality indication error caused by the user parameter errors (such as the signal to noise ratio (SNR), synchronization difference, location difference and the like) in the MU-MIMO transmission in the downlink channel feedback information, in the downlink channel feedback of the MU-MIMO transmission, thereby to achieve feeding more accurate downlink channel feedback information back to the base station. Moreover, the base station may obtain CQI and modulation coding mode more suitable for the user in a more accurate manner. Therefore, the demodulation error code rate may be reduced and the system performance may be improved.

Correspondingly, the other object of the disclosure is to provide user pairing at base station side, which uses information for representing the quality indication error caused by the parameter errors (such as the signal to noise ratio, synchronization difference, location difference and the like) of the user in the MU-MIMO transmission, thereby to achieve more accurate modulation coding and pairing. Therefore, the demodulation error code rate of the user may be reduced and the system performance may be improved.

Therefore, one embodiment of the disclosure provides a method for feeding back downlink channel feedback information of a MIMO communication system, comprising: calculating a multi-user channel quality indication error of a user in the system by the user, the multi-user channel quality indication error is used to reflect the difference in channel quality indication between the situation of multi-user multiple input multiple output transmission and the situation of single user multiple input multiple output transmission; and adding the multi-user channel quality indication error to the downlink channel feedback information including a pre-coding matrix indication and a channel quality indication, and feeding the same back to a base station for scheduling of the user.

Another embodiment of the disclosure provides a method for user pairing of MIMO, comprising: a downlink channel feedback information receiving step of receiving downlink channel feedback information from a user, the downlink channel feedback information includes a pre-coding matrix indication, a channel quality indication, and a multi-user channel quality indication error, wherein the multi-user channel quality indication error is used to reflect the difference in channel quality indication between the situation of MU-MIMO transmission and the situation of SU-MIMO transmission of the user; an initial paired user selecting step of selecting the user with the minimum multi-user channel quality indication error from transmitting users as an initial paired user, the transmitting users include all the current transmitting users which are allowed to enter a multi-user multiple input multiple output transmission mode; a correlation calculating step of calculating the correlation of each paired user to each of other transmitting users, and selecting one or more users from the other transmitting users as candidate paired user(s) according to the correlation; a paired user selecting step of selecting paired user(s) from the candidate paired user(s) according to the multi-user channel quality indication error; and repeating the correlation calculating step and the paired user selecting step until a predetermined number of paired users have been selected.

Another embodiment of the disclosure provides a method for communication in a Multiple Input Multiple Output system, comprising: feeding downlink channel feedback information back to a base station by a user; deciding by the base station whether a single user multiple input multiple output transmission mode or a multi-user multiple input multiple output transmission mode is used; obtaining a pre-coding matrix of the user by using a pre-coding matrix indication in the fed back downlink channel feedback information, and selecting a modulation coding mode for the user by using a channel quality indication in the fed back downlink channel feedback information, by the base station, in case of using the single user multiple input multiple output transmission mode; and executing pairing for the user, obtaining a pre-coding matrix for the multi-user multiple input multiple output transmission mode based on the pre-coding matrix indication in the downlink channel feedback information fed back by the user and the paired user(s) thereof, and selecting modulation coding mode corresponding to each user based on the channel quality indication and the multi-user channel quality indication error in the downlink channel feedback information fed back by the user and paired user(s) thereof, by the base station, in case of using the multi-user multiple input multiple output transmission mode; wherein the user uses the method for feeding back as described above to feed the downlink channel feedback information back to the base station, and the base station uses the method for user pairing as described above to execute user pairing.

In addition, one embodiment of the disclosure provides an apparatus for feeding back downlink channel feedback information of a MIMO communication system, comprising: a multi-user channel quality indication error calculating unit configured to calculate a multi-user channel quality indication error of a user, wherein the multi-user channel quality indication error is used to reflect the difference in channel quality indication between the situation of multi-user multiple input multiple output transmission and the situation of single user multiple input multiple output transmission of the user; and a downlink channel feedback information feeding back unit configured to add the multi-user channel quality indication error to the downlink channel feedback information including a pre-coding matrix indication and a channel quality indication, and feeding the same back to a base station for scheduling.

One embodiment of the disclosure provides an apparatus for user pairing of a MIMO communication system, comprising: a downlink channel feedback information receiving unit configured to receive downlink channel feedback information from a user, wherein the downlink channel feedback information includes a pre-coding matrix indication, a channel quality indication, and a multi-user channel quality indication error, wherein the multi-user channel quality indication error is used to reflect the difference in channel quality indication between the situation of multi-user multiple input multiple output transmission and the situation of single user multiple input multiple output transmission of the user; an initial paired user selecting unit configured to select the user with the minimum multi-user channel quality indication error from transmitting users as a paired user, the transmitting users include all the current transmitting users which are allowed to enter a multi-user multiple input multiple output transmission mode; a correlation calculating unit configured to calculate the correlation of each paired user to each of other transmitting users, and selecting one or more users as candidate paired user(s) according to the correlation; a paired user selecting unit configured to select paired user(s) from the candidate paired user(s) according to the multi-user channel quality indication error; and the correlation calculating unit and the paired user selecting unit are configured to repeat their operations until a predetermined number of paired users have been selected.

In addition, an embodiment of the disclosure further provides a user equipment comprising the apparatus for feeding back downlink channel feedback information as described above and a base station comprising the apparatus for user pairing as described above, and a communication system comprising at least one above user equipment and at least one above base station.

An embodiment of the disclosure also provides a computer program code when executed by a computing device to cause the computing device to perform the processes of any of above methods, a computer readable storage medium on which the computer program code is stored, and a computer program product.

Those and other advantages of the disclosure will be more apparent by detail explanations of the best embodiments of disclosure provided by referring to the Figure.

BRIEF DESCRIPTION OF THE DRAWINGS

The disclosure may be understood better by referring to description provided in conjunction with the drawings, wherein the same or similar reference signs are used to represent the same or similar components in all of the Figures. The Figures and the following detailed description are included in the Description and form a part of the Description, and they are used to further explain preferable embodiments of the disclosure and explain principle and object of the disclosure by examples. In the Drawings.

DETAILED DESCRIPTION OF THE INVENTION

Figure 1:
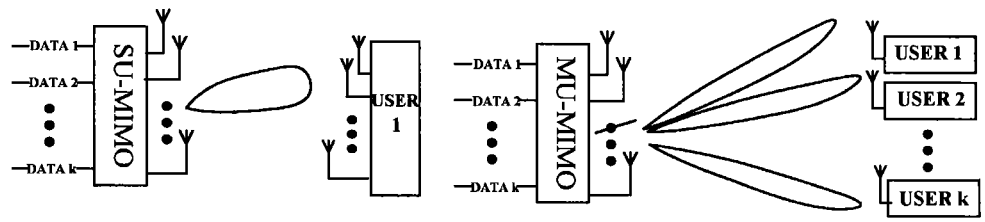
FIG. 1 is a schematic diagram illustrating the situation of SU-MIMO and the situation of MU-MIMO.

Example embodiments of the disclosure will be described in conjunction with the Figures. For the sake of clearness and conciseness, the description does not describe all features of the actual embodiments. However, it shall be understood that decisions specific to embodiments have to be made in a procedure of developing such an actual embodiment to achieve the specific object of the developer, for example, complying with limited conditions relative to system and transaction, and those limited conditions may change in different embodiments. In addition, it shall be understood that although the developing working may be complex and time consuming, such a developing working is only routine for those skilled in the art benefit from the disclosure of the disclosure.

In addition, it shall be noted that, to avoid blurring of the disclosure due to unnecessary details, only device structures and/or process steps closely related to the solution of the disclosure are illustrated in the drawings, and other details not closely related to the disclosure are omitted.

Figure 2:
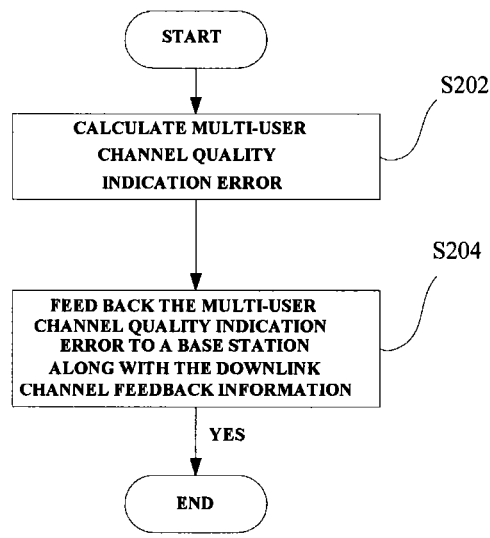
FIG. 2 is a flowchart illustrating a method for feeding back downlink channel feedback information according to an embodiment of the disclosure.

FIG. 2 is a flowchart illustrating a method for feeding back downlink channel feedback information according to an embodiment of the disclosure.

As shown in FIG. 2, at step S202, a user in a MIMO system calculates a multi-user channel quality indication error of the user.

Herein, the multi-user channel quality indication error may reflect the error in channel quality indication between the situation of MU-MIMO transmission and the situation of SU-MIMO transmission of the user. Such error may be caused by the parameters difference (such as the signal to noise ratio, synchronization difference, location difference and the like) of the user in the MU-MIMO transmission.

Next, at step S204, the user in the MIMO system feeds the multi-user channel quality indication error back to a base station along with the downlink channel feedback information.

Herein, as specified in LTE, the downlink channel feedback information which the user feeds back to the base station may include: the PMI for indicating a pre-coding matrix; and CQI for selecting a modulation coding mode of transmission data by the base station.

Herein, the user may use various known methods to obtain the PMI and CQI in the downlink channel feedback information.

For example, the user may find out a pre-coding matrix corresponding to the user based on the measured channel information matrix, and then generate the PMI for representing the pre-coding matrix. In addition, the user may obtain the value of related CQI based on the measured signal to noise ratio, for example.

As can be seen, in the method for feeding back downlink channel feedback information according to above embodiment, the multi-user channel quality indication error is further fed back to the base station, so that the error in channel quality indication between the situation of MU-MIMO transmission and the situation of SU-MIMO transmission of the user may be reflected more accurately.

In this way, the user feeds more accurate downlink channel feedback information back to the base station, so that the base station may obtain CQI and modulation coding mode more suitable for the user in a more accurate manner. Therefore, the demodulation error code rate of the user may be reduced in the communication system and the system performance may be improved.

In above method, the multi-user channel quality indication error may be calculated by considering various parameters and using any suitable method.

For example, in a specific embodiment of the disclosure, the multi-user channel quality indication error may be calculated based on the signal to noise ratio.

Figure 3:
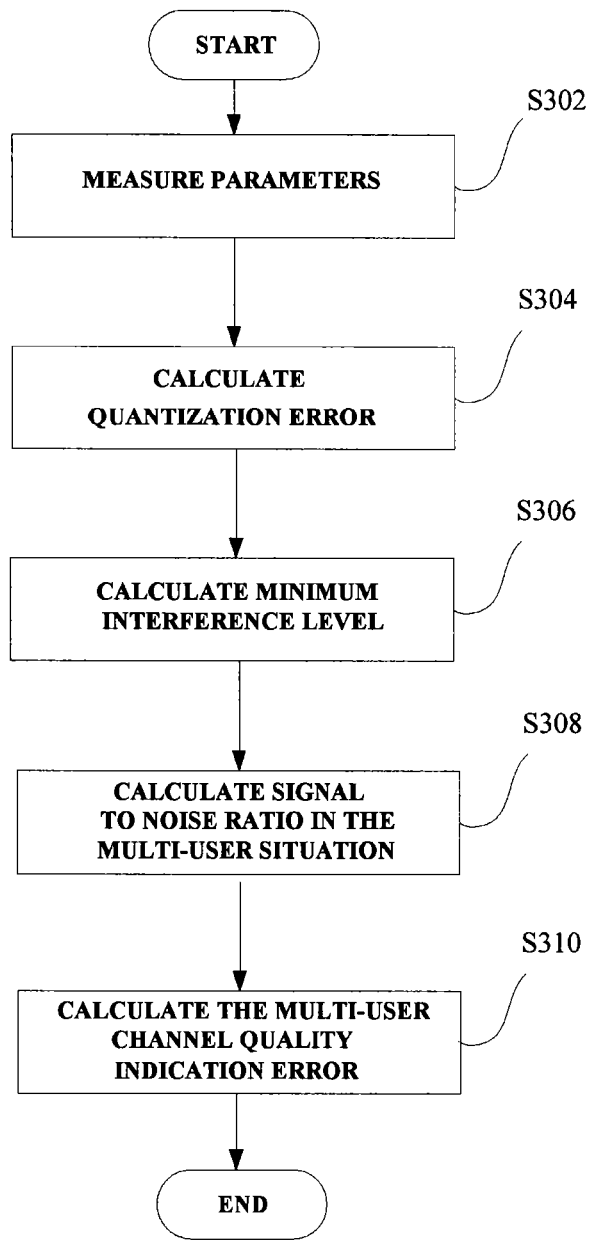
FIG. 3 is a flowchart illustrating a process for calculating the multi-user channel quality indication error according to the signal to noise ratio according to an embodiment of the disclosure.

FIG. 3 is a flowchart illustrating a process for calculating the multi-user channel quality indication error according to the signal to noise ratio according to an embodiment of the disclosure.

As shown in FIG. 3, a measuring is executed at step S302.

Specifically, a user may measure the channel state thereof, thereby to obtain channel information matrix and the signal to noise ratio of the user.

The user may obtain the pre-coding matrix of the user based on the measured channel information matrix.

For example, the pre-coding matrix may be obtained with the measured channel information matrix based on the following equation (1).

$$b = \arg\max_{i=1,\ldots,B} |H \cdot w_i| / \|H\| \tag{1}$$

In equation (1), H represents the measured channel information matrix of the user, $w_i$ represents the pre-coding matrix, i represents the location of the pre-coding matrix in codebook, by which the pre-coding matrix can be obtained from the codebook, and the size of the codebook is B.

Next, at step S304, quantization error may be calculated.

Herein, the quantization error is a parameter reflecting the error between the measured channel information matrix and the obtained pre-coding matrix.

The quantization error may be represented according to the channel information matrix and the pre-coding matrix.

For example, the quantization error may be calculated according to the following equation (2).

$$e = \frac{|H^H w_i|}{\|H\| \times \|w_i\|} \tag{2}$$

In equation (2), the meaning of H and $w_i$ are the same to that in equation (1), and e represents the quantization error.

Next, as shown in FIG. 3, at step S306, the minimum interference level to the user is calculated.

Specifically, out of all the potential paired users to which the user may pair, the user with the minimum interference level to the user is found out, and the minimum interference level is calculated.

Herein, the potential paired users may be users meeting an orthogonal condition, for example, and the orthogonal condition may be that the pre-coding matrix corresponding to a potential paired user is orthogonal to the pre-coding matrix of the user, for example.

For example, the minimum interference level may be calculated according to the following equation (3).

$$a = \min_{w_j * w_i^H = 0} (|H^H w_i|) \quad (3)$$

In equation (3), $w_j$ represents the pre-coding matrix of any potential paired user, the meaning of H and $w_i$ are the same to that in equation (1), and a represents the minimum interference level. In equation (3), $w_j^* w_i^H = 0$ represents the orthogonal condition.

Next, as shown in FIG. 3, at step S308, the signal to noise ratio of the user in the situation of multi-user is calculated.

Specifically, the above quantization error, the measured minimum interference level and the signal to noise ratio may be used to calculate the signal to noise ratio of the user in the situation of multi-user.

For example, the signal to noise ratio in the situation of multi-user may be calculated based on the following equation (4).

$$SNR_{MU-MIMO} = \frac{SNR/2 \times (e)^2}{SNR/2 \times a^2 + 1} \quad (4)$$

In equation (4), SNR represents the signal to noise ratio measured by the user, $SNR_{MU-MIMO}$ represents the evaluated signal to noise ratio of the user in the situation of multi-user, e represents the quantization error, and a represents the minimum interference level.

Next, with reference to FIG. 3, at step S310, multi-user channel quality indication error of the user in the situation of multi-user MIMO transmission may be calculated.

Specifically, the multi-user channel quality indication error may be calculated based on the signal to noise ratio measured by the user and the above calculated signal to noise ratio in MU-MIMO mode.

For example, the multi-user channel quality indication error may be calculated based on the following equation (5).

$$V = CQI(SNR) - CQI(SNR_{MU-MIMO}) \quad (5)$$

In equation (5), SNR represents the signal to noise ratio measured by the user, $SNR_{MU-MIMO}$ represents the calculated signal to noise ratio of the user in the situation of MU-MIMO transmission; CQI( ) represents channel quality indication function related to the signal to noise ratio; and V represents the multi-user channel quality indication error of the user.

In this way, the multi-user channel quality indication error of the user in the situation of MU-MIMO transmission may be calculated based on the signal to noise ratio.

In the above description, the calculation of the multi-user channel quality indication error is explained by only taking the signal to noise ratio as an example, however, the above description is only an example, and the disclosure is not limited to this. For example, the calculation of the multi-user channel quality indication error may be executed by considering the influence of the other parameters (for example, time parameters (such as time synchronization difference), location parameters, and the like). For example, the calculation of the multi-user channel quality indication error may also be implemented based on time parameters, or based on a combination of time parameters and the signal to noise ratio.

Correspondingly, an embodiment of the disclosure also provides a method of user pairing in MU-MIMO transmission mode of a MIMO system which is implemented at base station side.

Figure 4:
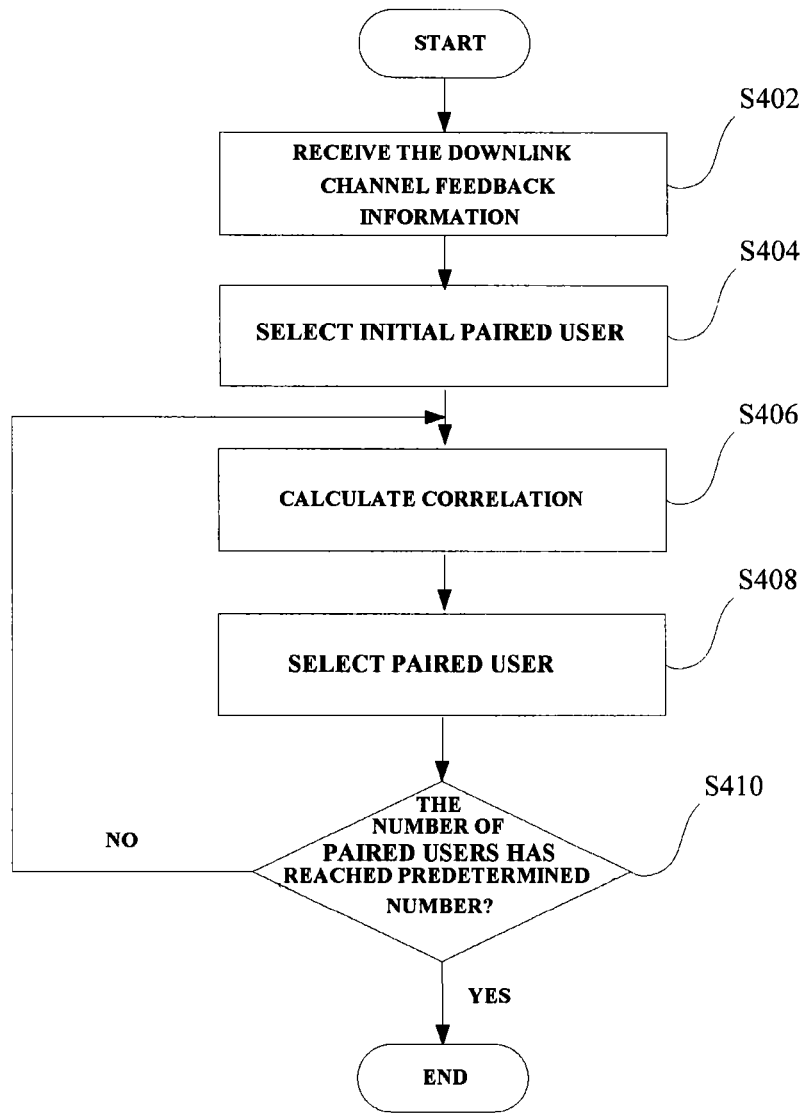
FIG. 4 is a flowchart illustrating a process for user pairing according to an embodiment of the disclosure.

FIG. 4 is a flowchart illustrating a method for user pairing in MU-MIMO transmission mode in a MIMO system according to an embodiment of the disclosure.

As shown in FIG. 4, at step S402, a base station receives downlink channel feedback information from a user.

In embodiments of the disclosure, the downlink channel feedback information may include pre-coding matrix indication, channel quality indication, and multi-user channel quality indication error, wherein the multi-user channel quality indication error is used to reflect the difference in channel quality indication between the situation of multi-user multiple input multiple output transmission and the situation of single user multiple input multiple output transmission of the user.

As a preferable example, the multi-user channel quality indication error may be calculated with the method according to the above embodiments of the disclosure.

Next, at step S404, the base station selects an initial paired user from transmitting users.

Preferably, the base station may select the user with the minimum multi-user channel quality indication error from the transmitting users as an initial paired user, for example.

In this specification, the transmitting users may be defined as one or more users which are allowed to enter a multi-user multiple input multiple output transmission mode out of the users being transmitting data currently.

The base station may decide whether a certain user may enter the MU-MIMO transmission mode (that is, decide the transmitting user) by using an existing decision strategy, for example, based on channel condition, rate requirement, current resource allocation, and the like of the user.

Next, at step S406, the base station calculates the correlation of each paired user to each of other transmitting users, and selects one or more users from the other transmitting users as candidate paired user(s) according to the correlation.

The correlation between two users may be calculated by using any known method.

For example, the correlation of each paired user to each of other transmitting users may be calculated by using the following equation (6).

$$\rho = \frac{|w_1 w_2^H|}{\|w_1\| \times \|w_2\|} \quad (6)$$

In the equation (6), w1 represents the pre-coding matrix of a paired user, and w2 represents the pre-coding matrix of a transmitting user, the pre-coding matrix of each user may be obtained according to PMI in the downlink channel feedback information fed back by the each user.

After calculating the correlation, the base station may select one or more users from the other transmitting users as the candidate paired user(s) according to the calculated correlation.

In an example, the base station may select one or more users with the correlation below a predetermined threshold as the candidate paired user(s).

In another example, the base station may also select one or more users with the minimum correlation as the candidate paired user(s).

Next, at step S408, the base station select a paired user from the candidate paired user(s).

Specifically, the base station may select according to the multi-user channel quality indication error of individual candidate paired user(s).

For example, the base station select a candidate paired user with the minimum multi-user channel quality indication error in the fed back downlink channel feedback information from the candidate paired user(s) as the paired user.

Next, at step S410, the base station decides whether a predetermined number of paired users have been selected.

If the number of the paired user selected by the base station has not reached the predetermined number, the steps S406 and S408 are repeated in order to select other paired users from the transmitting users, until the required number of paired users has been selected.

If the number of the paired user selected by the base station has reached the predetermined number, the pairing process ends.

In the above user pairing process, the base station uses the multi-user channel quality indication error fed back by the user. In this way, in the MU-MIMO transmission mode, the base station may implement more accurate pairing. Therefore, the system performance may be improved.

In addition, an embodiment of the disclosure provides a communication method in a MIMO system with the method for feeding back downlink channel feedback information according to the above embodiments of the disclosure and the method for user pairing according to the above embodiments of the disclosure.

Figure 5:
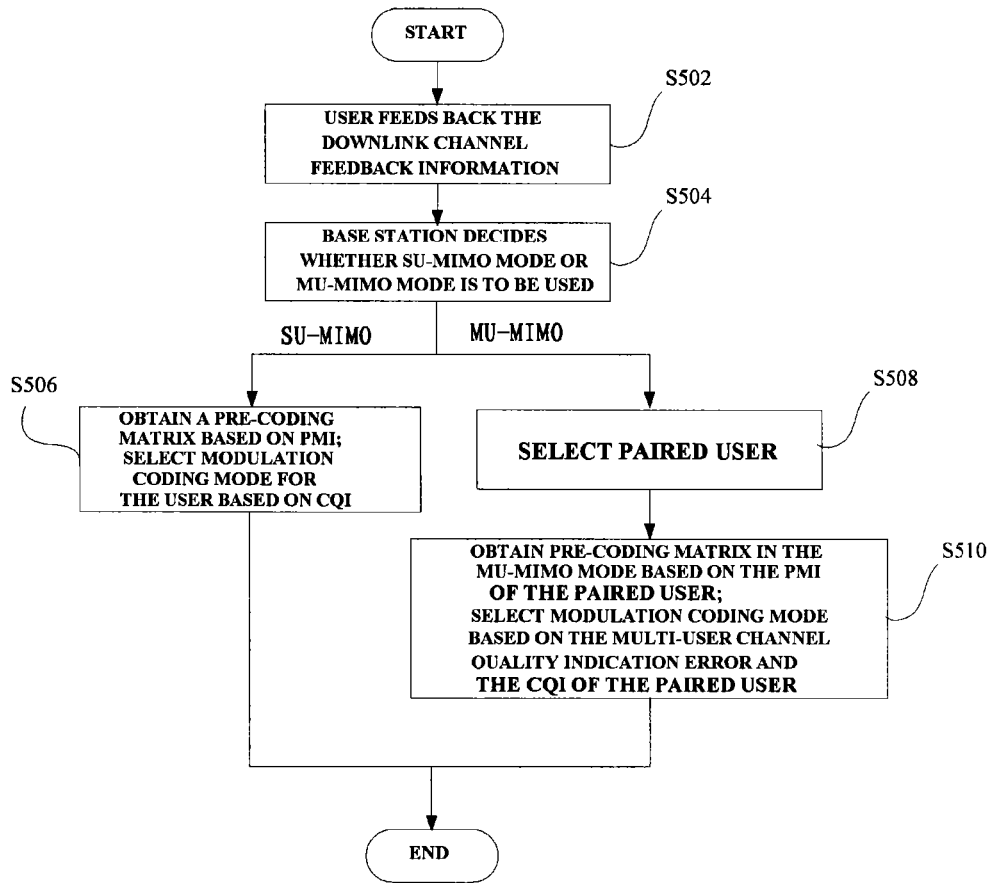
FIG. 5 is a flowchart illustrating a communication method in a MIMO system according to an embodiment of the disclosure.

FIG. 5 is a flowchart illustrating a communication method in a MIMO system according to an embodiment of the disclosure.

As shown in FIG. 5, at step S502, a user feeds downlink channel feedback information back to a base station.

For example, the user may feed the downlink channel feedback information back to the base station according to the method for feeding back downlink channel feedback information according to the above embodiments of the disclosure.

In this case, the downlink channel feedback information fed back by the user may include PMI, CQI, and multi-user channel quality indication error, wherein the multi-user channel quality indication error may reflect the difference in channel quality indication between the situation of MU-MIMO transmission and the situation of SU-MIMO transmission of the user.

Specifically, the user may calculate the multi-user channel quality indication error according to equations (1)-(5).

Next, at step S504, the base station decides whether a SU-MIMO transmission mode or a MU-MIMO transmission mode is used.

The base station may decide whether the SU-MIMO transmission mode or the MU-MIMO transmission mode is used according to an existing decision strategy.

For example, the base station may decide whether the SU-MIMO transmission mode or the MU-MIMO transmission mode is used according to one or more factors of channel condition, rate requirement, current resource allocation of the user, and the like.

With reference to FIG. 5, in case that the base station decides to use the SU-MIMO transmission mode, the base station may obtain a pre-coding matrix based on pre-coding matrix indication in the downlink channel feedback information fed back by the user, and select a modulation coding mode for the user based on the CQI in the downlink channel feedback information, and the base station does not use the multi-user channel quality indication error for the MU-MIMO transmission mode in the downlink channel feedback information fed back by the user.

With reference to FIG. 5, in case that the base station decides to use the MU-MIMO transmission mode, at step S508, the base station may select a paired user for the user.

For example, the base station may select the paired user for the user according to the method for user pairing according to the above embodiments of the disclosure. As for the detailed specific of the process for selecting the paired user, the above description with respect to FIG. 4 may be referred to, and thus will not be repeated for simplicity of the specification.

Next, at step S510, the base station calculates the pre-coding matrix in the MU-MIMO transmission mode and selects the suitable modulation coding mode for individual paired users.

For example, the base station may obtain the pre-coding matrix in the MU-MIMO transmission mode based on the pre-coding matrixes of individual paired users (which can be obtained with the PMI fed back by individual paired users), and select the modulation coding mode for individual paired users based on the CQI and multi-user channel quality indication error of individual paired users.

For example, the base station may obtain the pre-coding matrix corresponding to each paired user according to the PMI of the each paired user, and then the base station may further obtain the pre-coding matrix in the MU-MIMO transmission mode based on these pre-coding matrixes.

For example, the pre-coding matrix in the MU-MIMO transmission mode may be obtained based on the following equation (7)

$$G=[w_1,w_2]([w_1,w_2]^H[w_1,w_2])^{-1} \qquad (7)$$

In equation (7), G represents the pre-coding matrix in the MU-MIMO transmission mode, w1 represents the pre-coding matrix corresponding to the user, and w2 represents the pre-coding matrix corresponding to the paired user.

In addition, the base station may calculate the CQI of a paired user in the MU-MIMO mode based on the CQI and the multi-user channel quality indication error in the downlink channel feedback information of the paired user, and accordingly select a modulation coding mode for the user.

For example, the CQI of the user in the MU-MIMO mode may be calculated according to the CQI and the multi-user channel quality indication error according to the following equation (8).

$$CQI_{MU\text{-}MIMO}=CQI-V \qquad (8)$$

In equation (8), $CQI_{MU\text{-}MIMO}$ represents the channel quality indication of the paired user in the MU-MIMO transmission mode, CQI represents the value of the CQI included in the downlink channel feedback information of the paired user, and V represents the multi-user channel quality indication error in the downlink channel feedback information of the paired user.

In this way, in the MIMO system using the communication method according to the above embodiments of the disclosure, since the difference in channel quality indication between the situation of MU-MIMO transmission and the situation of SU-MIMO transmission of the user has been considered, the demodulation bit error rate of the user in the MIMO transmission mode can be reduced and the system performance can be improved.

In addition, according to the embodiments of the disclosure, apparatuses corresponding to the methods are also provided.

Figure 6:
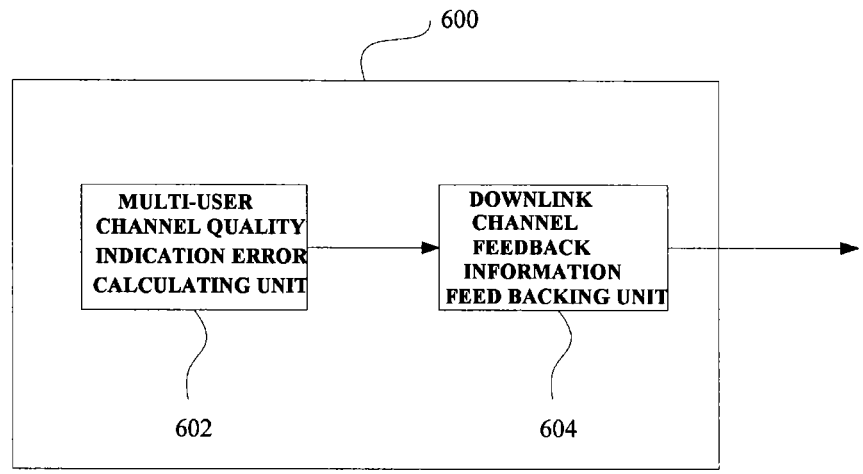
FIG. 6 illustrates an apparatus for feeding back downlink channel feedback information of a MIMO system according to an embodiment of the disclosure.

FIG. 6 illustrates an apparatus for feeding back downlink channel feedback information of a MIMO system according to an embodiment of the disclosure.

As shown in FIG. 6, the apparatus for feeding back downlink channel feedback information 600 according to an embodiment of the disclosure comprises a multi-user channel quality indication error calculating unit 602 and a downlink channel feedback information feeding back unit 604.

The multi-user channel quality indication error calculating unit 602 may calculate multi-user channel quality indication error of a user.

Herein, the multi-user channel quality indication error may reflect the error in channel quality indication between the situation of MU-MIMO transmission and the situation of SU-MIMO transmission of the user. Such error may be caused by the parameters difference (such as the signal to noise ratio, synchronization difference, location difference and the like) of the user in the MU-MIMO transmission.

The downlink channel feedback information feeding back unit 604 may add the multi-user channel quality indication error to downlink channel feedback information including PMI and CQI, and feeding the same back to a base station for scheduling.

As can be seen, in the apparatus for feeding back downlink channel feedback information according to above embodiment, the multi-user channel quality indication error is further fed back to the base station, so that the error in channel quality indication between the situation of MU-MIMO transmission and the situation of SU-MIMO transmission of the user may be reflected more accurately.

In this way, with this apparatus for feeding back downlink channel feedback information, the user may feed more accurate downlink channel feedback information back to the base station, so that the base station may obtain CQI and modulation coding mode more suitable for the user in a more accurate manner. Therefore, the demodulation error code rate of the user may be reduced in the communication system and the system performance may be improved.

In the apparatus for feeding back downlink channel feedback information of FIG. 6, the multi-user channel quality indication error calculating unit 602 may calculate the multi-user channel quality indication error based on various suitable parameters.

For example, in an embodiment of the disclosure, the multi-user channel quality indication error calculating unit may calculate the multi-user channel quality indication error based on the signal to noise ratio.

Figure 7:
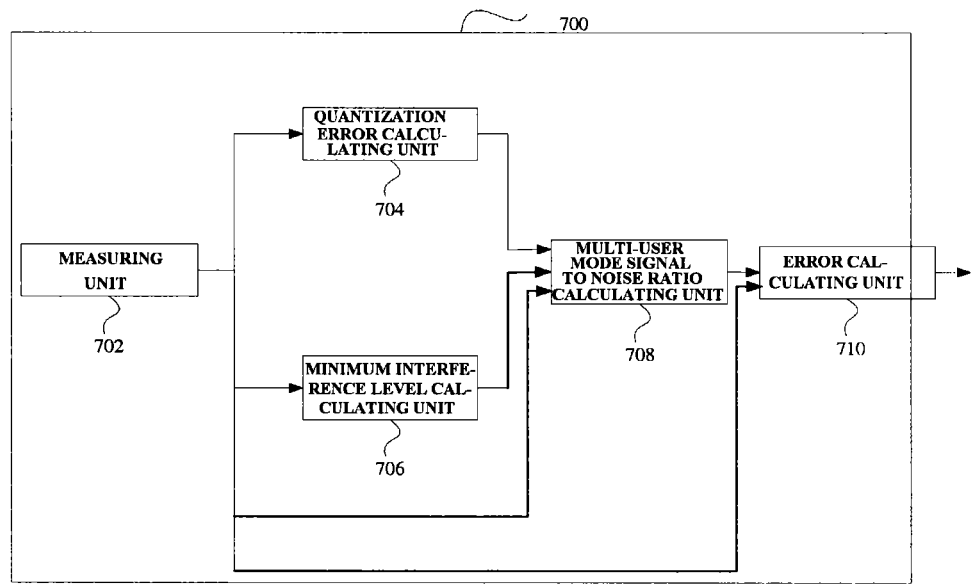
FIG. 7 is a schematic diagram illustrating a multi-user channel quality indication error calculating unit according to an embodiment of the disclosure.

FIG. 7 is a schematic diagram illustrating a multi-user channel quality indication error calculating unit according to an embodiment of the disclosure.

As shown in FIG. 7, the multi-user channel quality indication error calculating unit 700 comprises: a measuring unit 702, a quantization error calculating unit 704, a minimum interference level calculating unit 706, a multi-user mode signal to noise ratio calculating unit 708, and an error calculating unit 710.

Herein, the measuring unit 702 may measure channel state of the user, thereby to obtain channel information matrix and the signal to noise ratio of the user.

The quantization error calculating unit 704 may calculate quantization error, wherein the quantization error is a parameter reflecting the error between the measured channel information matrix and the obtained pre-coding matrix.

For example, the quantization error may be calculated according to equation (2) as mentioned above.

The minimum interference level calculating unit 706 may find out a user with the minimum interference level to the user out of all the potential paired users to which the user may pair, and calculate the minimum interference level.

For example, the minimum interference level may be calculated according to equation (3) as mentioned above.

The multi-user mode signal to noise ratio calculating unit 708 may calculate the signal to noise ratio of the user in the situation of multi-user.

Specifically, the signal to noise ratio of the user in the situation of multi-user may be calculated by using the quantization error, the minimum interference level, and the measured signal to noise ratio.

For example, the signal to noise ratio in the situation of multi-user may be calculated according to equation (4) as mentioned above.

The error calculating unit 710 may calculate the multi-user channel quality indication error in the multi-user MIMO transmission of the user.

Specifically, the error calculating unit 710 may calculate the multi-user channel quality indication error based on the signal to noise ratio measured by the user and the above calculated signal to noise ratio of the user in the multi-user MIMO transmission.

For example, the multi-user channel quality indication error may be calculated according to equation (5) as mentioned above.

In this way, the multi-user channel quality indication error calculating unit according to the embodiments of the disclosure may calculate the multi-user channel quality indication error in the situation of multi-user MIMO transmission of the user based on the signal to noise ratio.

In above description, the multi-user channel quality indication error calculating unit calculates the multi-user channel quality indication error based on the signal to noise ratio, however, the above description is only an example, and the disclosure is not limited to this. For example, the calculation of the multi-user channel quality indication error calculating unit may also be based on the other parameters (for example, time parameters, location parameters, and the like). For example, the calculation of the multi-user channel quality indication error calculating unit may be based on time parameters, or based on a combination of time parameters and the signal to noise ratio.

Correspondingly, an embodiment of the disclosure also provides an apparatus for user pairing in MU-MIMO transmission mode in a MIMO system.

Figure 8:
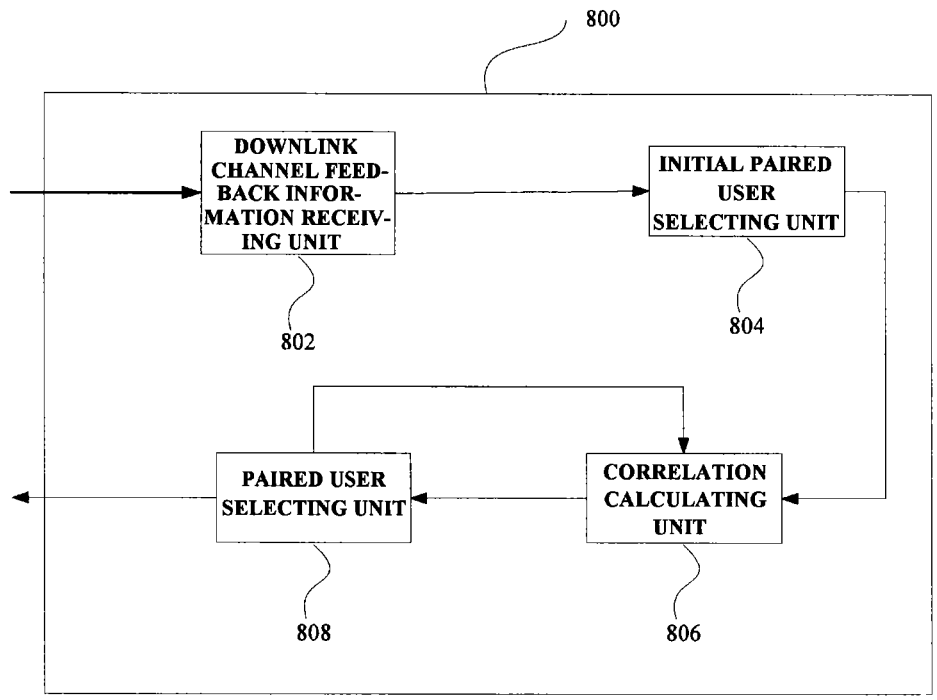
FIG. 8 illustrates an apparatus for user pairing in MU-MIMO transmission mode in a MIMO system according to an embodiment of the disclosure.

FIG. 8 illustrates an apparatus for user pairing in MU-MIMO transmission mode in a MIMO system according to an embodiment of the disclosure.

As shown in FIG. 8, the apparatus for user pairing 800 according to an embodiment of the disclosure comprises: a downlink channel feedback information receiving unit 802, initial paired user selecting unit 804, a correlation calculating unit 806, and a paired user selecting unit 808.

Herein, the downlink channel feedback information receiving unit 802 may receive downlink channel feedback information from a user.

In the embodiments of the disclosure, the downlink channel feedback information received by the base station from the user may include PMI, CQI, and multi-user channel quality indication error, wherein the multi-user channel quality indication error is used to reflect the difference in channel quality indication between the situation of multi-user multiple input multiple output transmission and the situation of single user multiple input multiple output transmission of the user.

As a preferable example, the multi-user channel quality indication error may be calculated with the method according to the above embodiments of the disclosure.

The initial paired user selecting unit 804 may select an initial paired user from transmitting users.

Preferably, the initial paired user selecting unit 804 may select the user with the minimum multi-user channel quality indication error from the transmitting users as an initial paired user, for example.

In this specification, the transmitting users may be defined as one or more users which are allowed to enter a MU-MIMO transmission mode out of the users being transmitting data currently.

The base station may decide whether a certain user may enter the MU-MIMO transmission mode by using an existing decision strategy, for example, based on channel condition, rate requirement, current resource allocation, and the like of the user.

The correlation calculating unit 806 may calculate the correlation of each paired user to each of other transmitting users, and select one or more users as candidate paired user(s) according to the correlation.

The correlation between two users may be calculated by using any known method.

For example, the correlation of each paired user to each of other transmitting users may be calculated by using equation (6) as mentioned above.

After calculating the correlation, the correlation calculating unit 806 may select one or more users from the other transmitting users as the candidate paired user(s) according to the calculated correlation.

In an example, the correlation calculating unit 806 may select one or more users with the correlation below a predetermined threshold as the candidate paired user(s).

In another example, the correlation calculating unit 806 may also select one or more users with the minimum correlation as the candidate paired user(s).

Next, with reference to FIG. 8, the paired user selecting unit 808 may select a paired user from the candidate paired user(s).

Specifically, the base station may select according to the multi-user channel quality indication error of individual candidate paired user(s).

For example, the base station may select a candidate paired user with the minimum multi-user channel quality indication error in the fed back downlink channel feedback information as the paired user.

As shown in FIG. 8, the correlation calculating unit 806 and the paired user selecting unit 808 may repeat their operations until a predetermined number of paired users have been selected.

In the above user pairing process, the base station uses the multi-user channel quality indication error fed back by the user. In this way, in the MU-MIMO transmission mode, the base station may implement more accurate pairing. Therefore, the system performance may be improved.

The above embodiments are provided to facilitate understanding of the conception of the disclosure. However, the above description is only an example, and the disclosure is not limited to this. Various modifications may be made without departing from the conception of the disclosure.

For example, in above description, the downlink channel feedback information fed by the user back to the base station only includes one PMI indication (for example, corresponding to the feedback scheme of single codebook). However, the disclosure is not limited to this, and the method (apparatus) for feeding back downlink channel feedback information and the method (apparatus) for user pairing according to the embodiments of the disclosure may also be applied to other feedback schemes.

Application Example of Dual Codebook Feedback

According to the specifications of LTE-A, in 2-antenna or 4-antenna base station configurations, a user feeds one PMI back to a base station (that is, single codebook feedback scheme), and the PMI corresponds to one pre-coding matrix. In an 8-antenna base station configuration, a user feeds two PMI back to a base station (that is, dual codebook feedback scheme), wherein one PMI corresponds to transmission bandwidth information of the downlink channel and the other PMI corresponds to sub-band information in the transmission bandwidth of the downlink channel; the pre-coding matrix is decided by both matrixes to which these two PMI correspond.

The method (apparatus) for feeding back downlink channel feedback information according to the embodiments of the disclosure and the method (apparatus) for user pairing according to the embodiments of the disclosure may also be applied to the above dual codebook feedback scheme.

In case of using the dual codebook feedback scheme, the process of calculating multi-user channel quality indication error by the user is the same to the process of single codebook feedback scheme as described above in connection with FIG. 3 using equations (1)-(5).

In feeding back the downlink channel feedback information, the difference between the dual codebook feedback scheme and the single codebook feedback scheme is only that the feedback formats are different, that is, the downlink channel feedback information fed by the user back to the base station includes two PMI, CQI, and the multi-user channel quality indication error in the dual codebook feedback scheme.

On the other hand, in case of using the dual codebook feedback scheme, the process of user pairing in the MU-MIMO transmission mode by the base station is the same to the process as described above in connection with FIG. 4.

In addition, the method (apparatus) for feeding back downlink channel feedback information and the method (apparatus) for user pairing according to the embodiments of the disclosure are not limited to the above single codebook feedback scheme and dual codebook feedback scheme, and may also be extended to be applied to more other feedback schemes.

Application Example of Other Feedback Schemes

For example, in another known feedback scheme, the transmission bandwidth is further divided into at least one sub-band. In this case, the PMI portion of downlink channel feedback information fed by a user back to a base station may include PMI corresponding to the transmission bandwidth information, and at least one sub-band PMI individually corresponding to the at least one sub-band in the transmission bandwidth.

The method (apparatus) for feeding back downlink channel feedback information according to the embodiments of the disclosure and the method (apparatus) for user pairing according to the embodiments of the disclosure may also be applied to the above feedback scheme.

In the above feedback scheme (the PMI portion includes at least one sub-band PMI corresponding to the at least one sub-band in the transmission bandwidth), the user may use the process according to the above embodiments of the disclosure (for example, with reference to FIG. 3 and equations (1)-(5)) to calculate corresponding multi-user channel quality indication error for each sub-band.

Therefore, in the above feedback scheme, the downlink channel feedback information fed by the user back to the base station includes: PMI portion, which includes the PMI corresponding to the transmission bandwidth information of the downlink channel, and at least one sub-band PMI corresponding to the at least one sub-band in the transmission bandwidth of the downlink channel; at least one multi-user channel quality indication error individually corresponding to the at least one sub-band; and at least one CQI individually corresponding to the at least one sub-band.

Herein, the PMI and CQI corresponding to each sub-band may be obtained based on the SNR and channel information matrix measured by the user for each sub-band.

On the other hand, in the above feedback scheme, the process of user pairing in the MU-MIMO transmission mode by the base station is the same to the process as described above in connection with FIG. 4.

Obviously, in addition to the two feedback schemes proposed above as examples, the method (apparatus) for feeding back downlink channel feedback information according to the embodiments of the disclosure and the method (apparatus) for user pairing according to the embodiments of the disclosure may also be applied to other feedback schemes or the feedback schemes which may occur in future, and the description thereof will be omitted for simplicity of the specification.

In addition, an embodiment of the disclosure provides a communication terminal comprising the apparatus for feeding back downlink channel feedback information according to the embodiments of the disclosure. In this way, the terminal according to the embodiments of the disclosure may feed the multi-user channel quality indication error back to the base station, so that the error in channel quality indication between the situation of MU-MIMO transmission and the situation of SU-MIMO transmission of the user may be reflected more accurately. Therefore, the system performance may be improved.

An embodiment of the disclosure also provides a base station comprising the apparatus for user pairing in MU-MIMO transmission mode in a MIMO system according to the embodiments of the disclosure. In this way, the base station according to the embodiments of the disclosure may implement more accurate pairing in the MU-MIMO transmission mode. Therefore, the system performance may be improved.

Further, an embodiment of the disclosure provides a MIMO communication system comprising at least one communication terminal according to the above embodiments of the disclosure and at least one base station according to the above embodiments of the disclosure. In this way, the MIMO system according to the embodiments of the disclosure may implement more accurate pairing in the MU-MIMO transmission mode. Therefore, the system performance may be improved.

In addition, it shall be understood that various examples and embodiments described herein are exemplary, and the disclosure is not limited to this. In the specification, terms "first", "second", etc. are only for distinguishing the features described by them literally in order to illustrate the disclosure in a manner of clarity. Therefore, it shall not deem them to have any limited meaning.

Various component modules and units of the above apparatuses may be configured by software, firmware, hardware or their combination thereof. Specific means and manners that may be used by the configuration are well known to those skilled in the art, and details are omitted here. In case of implementing the base station by software or firmware, program constituting the software may be mounted to a computer having a dedicated hardware structure from a storage medium or network (for example, the universal computer 900 as illustrated in FIG. 9), when the computer is mounted with various program, the computer may execute various functions.

Figure 9:
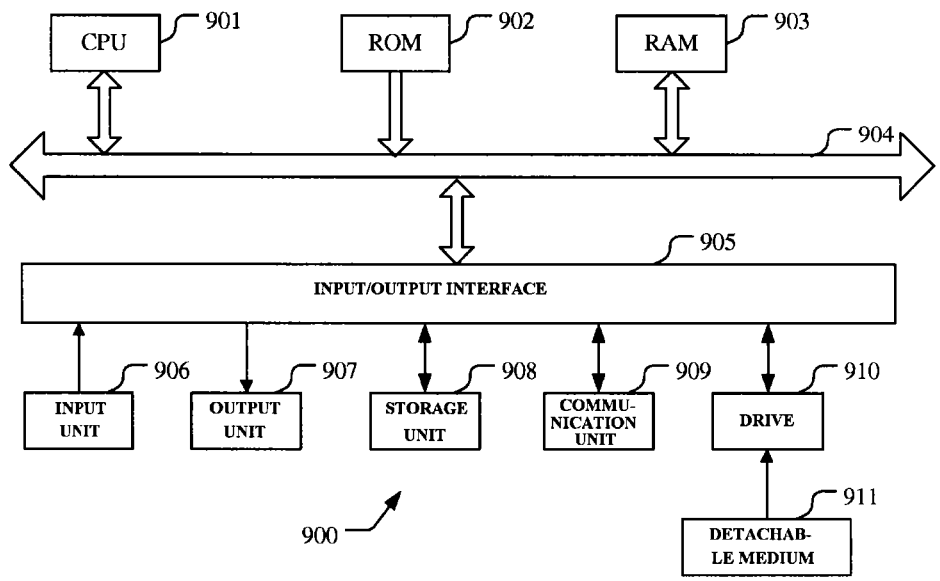
FIG. 9 is a block diagram illustrating an example structure of a universal personal computer that may implement the methods and/or apparatuses according to embodiments of the disclosure.

In FIG. 9, a central processing unit (CPU) 901 perform various processes according to the program stored in the Read-Only Memory (ROM) 902 or programs load from the storage unit 908 to the Random Access Memory (RAM) 903. In the RAM 903, store also data required when the CPU 901 performs various processes. CPU 901, ROM 902 and RAM 903 are connected from one to another via bus 904. Input/output interface 905 is also connected to the bus 904.

The following components are connected to the input/output interface 905: input unit 906 (including keyboard, mouse, etc.); output unit 907 (including display, such as cathode ray tube (CRT), liquid crystal display (LCD), etc., and speakers and so on); storage unit 908 (including hard disc, etc.); and communication part 909 (including network interface cards such as LAN cards, modems and so on). The communication unit 909 performs communication process via network like the internet. According to requirements, drive 910 is also connected to the input/output interface 905. Detachable medium 911 such as disc, CD, magneto-optical disc, semiconductor memory, and so on is installed on the drive 910 based on requirements, such that the computer program read out therefrom is installed in the storage unit 908 based on requirements.

In case of implementing the above processes by software, programs constituting the software are installed from a network like the Internet or from a storage medium like the detachable medium 911.

Those skilled in the art should be understood that such storage medium is not limited to the detachable medium 911 which is stored with programs and distributes separate from the method to provide a user with program as illustrated in FIG. 9. The example of the detachable medium 911 includes disc (including floppy disc (registered marks)), CD (including CD read only memory (CD-ROM) and digital versatile disc (DVD)), magneto-optical disc (including mini-disc (MD) (registered marks)) and semiconductor memory. Alternatively, the storage medium may be ROM 902, or hard disc included in the storage unit 908 in which a program is stored and the program is distributed to a user with the method including the same.

The disclosure also provides a program product storing machine readable instruction code. When read and executed by a machine, the instruction code may implement the method according to the embodiment of the disclosure.

Correspondingly, a storage medium for carrying the program code storing the machine readable instruction code is also included in the disclosure. The storage medium includes, but not limited to, Floppy disk, CD-ROMs, magneto-optical disk, memory card, memory stick, etc.

At last, it needs to be explained that the technical terms "comprise/include" or other variants intend to cover non-exclusion inclusion, such that process, method, article of a series of elements are comprised, or the device includes not only those elements, but also other elements that are not listed evidently or further comprises the process, method, article or elements inherent in the device. In addition, in case of no more limitations, the elements defined by the sentence "comprising a . . . " do not exclude a case that there are other the same elements in the process, method, article or device including the elements.

Although embodiments of the disclosure have been described in detail by combining with the Figure, it shall be understood that the embodiments described above are only used to illustrate the disclosure, and do not limit the disclosure. For those skilled in the art, the embodiments may be changed in various manners without departing from the substance and scope of the disclosure. Therefore, the scope of the disclosure is only defined by the attached claims and its equivalent meanings.

The invention claimed is:

1. A method for feeding back downlink channel feedback information of a Multiple Input Multiple Output, MIMO, communication system, comprising:
   calculating a multi-user channel quality indication error of a user in the system by the user, wherein the multi-user channel quality indication error is used to reflect the difference in channel quality indication between the situation of multi-user multiple input multiple output transmission and the situation of single user multiple input multiple output transmission of the user; and
   adding the multi-user channel quality indication error to the downlink channel feedback information including a pre-coding matrix indication and a channel quality indication, and feeding the same back to a base station for scheduling,
   wherein when the base station is configured in an 8-antenna base station configuration, the pre-coding matrix indication comprises, within the same downlink channel feedback information, a first pre-coding matrix indication corresponding to feedback bandwidth information of a measured channel state over an entire bandwidth of the downlink channel and a second pre-coding matrix indication, corresponding to sub-band information of a measured channel state over a sub-band of the bandwidth of the downlink channel that is selected by the base station, and when the base station is configured in a 2-antenna or a 4-antenna base station configuration, the pre-coding matrix indication corresponds to only one pre-coding matrix, and
   the calculating the multi-user channel quality indication error comprises:
   calculating the multi-user channel quality indication error based on signal to noise ratio of the user, and further comprises:
   measuring a channel state of the user to obtain a channel information matrix and the signal to noise ratio;
   calculating a quantization error according to the channel information matrix and a pre-coding matrix obtained based on the channel information matrix;
   finding out channel with the minimum interference level from channels orthogonal to the channel of the user;
   calculating the signal to noise ratio of the user in the situation of multi-user multiple input multiple output transmission; and
   calculating the multi-user channel quality indication error according to the measured signal to noise ratio and the calculated signal to noise ratio of the user in the situation of multi-user multiple input multiple output transmission.

2. The method according to claim 1, wherein the calculating the signal to noise ratio of the user in the situation of multi-user multiple input multiple output transmission comprises:
   calculating the signal to noise ratio of the user in the situation of multi-user multiple input multiple output transmission by using the quantization error, the minimum interference level, and the measured signal to noise ratio.

3. The method according to claim 1, wherein the second pre-coding matrix indication comprises at least one sub-band pre-coding matrix indication individually corresponding to at least one sub-band, the multi-user channel quality indication error comprises at least one sub-band multi-user channel quality indication error individually corresponding to the at least one sub-band, and the channel quality indication comprises at least one sub-band channel quality indication individually corresponding to the at least one sub-band.

4. The method according to claim 1, wherein calculating a multi-user channel quality indication error of a user in the system by the user further comprises determining a minimum interference level of users orthogonal to the user and calculating the multi-user channel quality indication error of the user according to the minimum interference level.

5. An apparatus for feeding back downlink channel feedback information of a Multiple Input Multiple Output, MIMO, communication system, comprising:
   processing circuitry configured to
      calculate a multi-user channel quality indication error of a user, wherein the multi-user channel quality indication error is used to reflect the difference in channel quality indication between the situation of multi-user multiple input multiple output transmission and the situation of single user multiple input multiple output transmission of the user; and
      add the multi-user channel quality indication error to the downlink channel feedback information including a pre-coding matrix indication and a channel quality indication, and feeding the same back to a base station for scheduling,
   wherein when the base station is configured in an 8-antenna base station configuration, the pre-coding matrix indication comprises, within the same downlink channel feedback information, a first pre-coding matrix indication corresponding to feedback bandwidth information of a measured channel state over an entire bandwidth of the downlink channel and a second pre-coding matrix indication, corresponding to sub-band information of a measured channel state over a sub-band of the bandwidth of the downlink channel that is selected by the base station, and when the base station is configured in a 2-antenna or a 4-antenna base station configuration, the pre-coding matrix indication corresponds to only one pre-coding matrix, and
   the processing circuitry is further configured to calculate the multi-user channel quality indication error based on the signal to noise ratio of the user, and is further configured to:
   measure a channel state of the user to obtain a channel information matrix and the signal to noise ratio;
   calculate a quantization error according to the channel information matrix and a pre-coding matrix obtained based on the channel information matrix;
   find out channel with the minimum interference level from channels orthogonal to the channel of the user;
   calculate the signal to noise ratio of the user in the situation of multi-user multiple input multiple output transmission; and
   calculate the multi-user channel quality indication error according to the measured signal to noise ratio and the calculated signal to noise ratio of the user in the situation of multi-user multiple input multiple output transmission.

6. The apparatus according to claim 5, wherein the processing circuitry is further configured to calculate the signal to noise ratio of the user in the situation of multi-user multiple input multiple output transmission by using the quantization error, the minimum interference level, and the measured signal to noise ratio obtained.

7. The apparatus according to claim 5, wherein the processing circuitry is further configured to determine a minimum interference level of users orthogonal to the user and calculate the multi-user channel quality indication error of the user according to the minimum interference level.

8. A non-transitory computer readable medium having stored therein computer executable instructions, which, when run in a computer, execute a method for feeding back downlink channel feedback information of a Multiple Input Multiple Output, MIMO, communication system, the method comprising:
  calculating a multi-user channel quality indication error of a user in the system by the user, wherein the multi-user channel quality indication error is used to reflect the difference in channel quality indication between the situation of multi-user multiple input multiple output transmission and the situation of single user multiple input multiple output transmission of the user; and
  adding the multi-user channel quality indication error to the downlink channel feedback information including a pre-coding matrix indication and a channel quality indication, and feeding the same back to a base station for scheduling,
  wherein when the base station is configured in an 8-antenna base station configuration, the pre-coding matrix indication comprises, within the same downlink channel feedback information, a first pre-coding matrix indication corresponding to feedback bandwidth information of a measured channel state over an entire bandwidth of the downlink channel and a second pre-coding matrix indication, corresponding to sub-band information of a measured channel state over a sub-band of the bandwidth of the downlink channel that is selected by the base station, and when the base station is configured in a 2-antenna or a 4-antenna base station configuration, the pre-coding matrix indication corresponds to only one pre-coding matrix, and
  the calculating the multi-user channel quality indication error comprises:
  calculating the multi-user channel quality indication error based on signal to noise ratio of the user, and further comprises:
  measuring a channel state of the user to obtain a channel information matrix and the signal to noise ratio;
  calculating a quantization error according to the channel information matrix and a pre-coding matrix obtained based on the channel information matrix;
  finding out channel with the minimum interference level from channels orthogonal to the channel of the user;
  calculating the signal to noise ratio of the user in the situation of multi-user multiple input multiple output transmission; and
  calculating the multi-user channel quality indication error according to the measured signal to noise ratio and the calculated signal to noise ratio of the user in the situation of multi-user multiple input multiple output transmission.

9. An electronic device in a Multiple Input Multiple Output, MIMO, communication system, comprising:
  processing circuitry, configured to
    determine a difference of downlink channel quality between a first transmission and a second transmission; and
    generate channel state information including information indicating the difference, a channel quality indication of the first transmission and at least one pre-coding matrix indication for feeding back to a base station for scheduling,
  wherein when the base station is configured in an 8-antenna base station configuration, the processing circuitry is further configured to include, in the same channel state information, a first pre-coding matrix indication corresponding to a measured channel state over an entire transmission bandwidth of the downlink channel and a second pre-coding matrix indication corresponding to a measured channel state over a sub-band in the transmission bandwidth of the downlink channel that is selected by the base station, and when the base station is configured in a 2-antenna or a 4-antenna base station configuration, the processing circuitry is further configured to include, in the channel state information, a pre-coding matrix indication that corresponds to only one pre-coding matrix, and
  the processing circuitry is further configured to calculate the multi-user channel quality indication error based on the signal to noise ratio of the user, and is further configured to:
  measure a channel state of the user to obtain a channel information matrix and the signal to noise ratio;
  calculate a quantization error according to the channel information matrix and a pre-coding matrix obtained based on the channel information matrix;
  find out channel with the minimum interference level from channels orthogonal to the channel of the user;
  calculate the signal to noise ratio of the user in the situation of multi-user multiple input multiple output transmission; and
  calculate the multi-user channel quality indication error according to the measured signal to noise ratio and the calculated signal to noise ratio of the user in the situation of multi-user multiple input multiple output transmission.

10. The electronic device according to claim 9, wherein the processing circuitry is further configured to determine the difference by subtracting a channel quality indication of the second transmission from the channel quality indication of the first transmission.

11. The electronic device according to claim 9, wherein the first transmission corresponds to a single user MIMO transmission and the second transmission corresponds to a multi-user MIMO transmission.

12. The electronic device according to claim 9, wherein the electronic device is user equipment and further comprises multiple antennas configured to transmit the channel state information to the base station via an radio interface.

13. A communication method for an electronic device in a Multiple Input Multiple Output, MIMO, communication system, comprising:
  determining a difference of downlink channel quality between a first transmission and a second transmission; and
  generating channel state information including information indicating the difference, a channel quality indication of the first transmission and at least one pre-coding matrix indication for feeding back to a base station for scheduling, wherein when the base station is configured in an 8-antenna base station configuration, the method comprises including, in the same channel state information, a first pre-coding matrix indication corresponding to a measured channel state over an entire transmission bandwidth of the downlink channel and a second pre-coding matrix indication corresponding to a measured channel state over a sub-band in the transmission bandwidth of the downlink channel that is selected by the base station, and when the base station is configured in a 2-antenna or a 4-antenna base station configuration, the method comprises including, in the channel state information, a pre-coding matrix indication that corresponds to only one pre-coding matrix, and the generating channel state information includes calculating a multi-user channel quality indication error based on signal to noise ratio of the user, and further comprises:

measuring a channel state of the user to obtain a channel information matrix and the signal to noise ratio;

calculating a quantization error according to the channel information matrix and a pre-coding matrix obtained based on the channel information matrix;

finding out channel with the minimum interference level from channels orthogonal to the channel of the user;

calculating the signal to noise ratio of the user in the situation of multi-user multiple input multiple output transmission; and calculating the multi-user channel quality indication error according to the measured signal to noise ratio and the calculated signal to noise ratio of the user in the situation of multi-user multiple input multiple output transmission.

14. A non-transitory computer readable medium having stored therein computer executable instructions, which, when run in a computer, execute a communication method for an electronic device in a Multiple Input Multiple Output, MIMO, communication system, the method comprising:

determining a difference of downlink channel quality between a first transmission and a second transmission; and generating channel state information including information indicating the difference, a channel quality indication of the first transmission and at least one pre-coding matrix indication for feeding back to a base station for scheduling, wherein when the base station is configured in an 8-antenna base station configuration, the method comprises including, in the same channel state information, a first pre-coding matrix indication corresponding to a measured channel state over an entire transmission bandwidth of the downlink channel and a second pre-coding matrix indication corresponding to a measured channel state over a sub-band in the transmission bandwidth of the downlink channel that is selected by the base station, and when the base station is configured in a 2-antenna or a 4-antenna base station configuration, the method comprises including, in the channel state information, a pre-coding matrix indication that corresponds to only one pre-coding matrix, and the generating channel state information includes calculating a multi-user channel quality indication error based on signal to noise ratio of the user, and further comprises:

measuring a channel state of the user to obtain a channel information matrix and the signal to noise ratio;

calculating a quantization error according to the channel information matrix and a pre-coding matrix obtained based on the channel information matrix;

finding out channel with the minimum interference level from channels orthogonal to the channel of the user;

calculating the signal to noise ratio of the user in the situation of multi-user multiple input multiple output transmission; and calculating the multi-user channel quality indication error according to the measured signal to noise ratio and the calculated signal to noise ratio of the user in the situation of multi-user multiple input multiple output transmission.

* * * * *